United States Patent
Wu et al.

(10) Patent No.: US 12,399,823 B2
(45) Date of Patent: Aug. 26, 2025

(54) MEMORY DEVICE, FLASH MEMORY CONTROLLER AND ASSOCIATED CONTROL METHOD

(71) Applicant: Silicon Motion, Inc., Hsinchu County (TW)

(72) Inventors: Yi-An Wu, New Taipei (TW); Wei-Lin Chen, Tainan (TW); Zih-Jie Huang, Changhua County (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 18/592,444

(22) Filed: Feb. 29, 2024

(65) Prior Publication Data

US 2024/0403211 A1 Dec. 5, 2024

(30) Foreign Application Priority Data

Jun. 1, 2023 (TW) .................... 112120452

(51) Int. Cl.
*G06F 12/02* (2006.01)
*G06F 13/16* (2006.01)

(52) U.S. Cl.
CPC ...... *G06F 12/0292* (2013.01); *G06F 12/0246* (2013.01); *G06F 13/1673* (2013.01); *G06F 2212/7201* (2013.01)

(58) Field of Classification Search
None
See application file for complete search history.

(56) References Cited

U.S. PATENT DOCUMENTS

| 9,213,633 | B2 * | 12/2015 | Canepa | G06F 12/0246 |
| 10,545,876 | B2 * | 1/2020 | Su | G06F 12/0897 |
| 10,776,280 | B1 * | 9/2020 | Yang | G06F 12/0246 |
| 11,036,646 | B2 * | 6/2021 | Hsu | G06F 12/0246 |
| 2016/0026406 | A1 * | 1/2016 | Hahn | G06F 3/0685 |
| | | | | 711/103 |

FOREIGN PATENT DOCUMENTS

| CN | 113590506 A | * 11/2021 | ......... G06F 12/0646 |
| CN | 111610931 B | 5/2023 | |
| TW | 202030613 A | 8/2020 | |
| TW | 202042065 A | 11/2020 | |

OTHER PUBLICATIONS

Translation of Cai et al. (CN 113590506). 2025.*

* cited by examiner

*Primary Examiner* — Nathan Sadler
(74) *Attorney, Agent, or Firm* — Winston Hsu

(57) ABSTRACT

The present invention provides a control method of a flash memory controller. By dividing a plurality of logical address to physical address mapping tables into multiple groups, establishing a group-to-physical address mapping table, a storage unit relationship table and a latest updated storage unit table to manage the flash memory controller, the times of loading the group-to-physical address mapping table into a buffer memory can be reduced, so as to improve the efficiency of the flash memory controller.

12 Claims, 13 Drawing Sheets

| Storage unit of host buffer | L2P mapping table | Previous storage unit corresponding to the same group |
|---|---|---|
| S1 | 0xFF | 0xFF |
| S2 | 0xFF | 0xFF |
| S3 | 0xFF | 0xFF |
| S4 | 0xFF | 0xFF |
| S5 | 0xFF | 0xFF |
| S6 | 0xFF | ... |
| ... | ... | |

610

| Group | Storage unit having last updated L2P mapping table |
|---|---|
| G1 | 0xFF |
| G2 | 0xFF |
| G3 | 0xFF |
| ... | ... |

Write updated MT1 into S1, and update 610 and 620

610

| Storage unit of host buffer | L2P mapping table | Previous storage unit corresponding to the same group |
|---|---|---|
| S1 | MT1 | 0xFF |
| S2 | 0xFF | 0xFF |
| S3 | 0xFF | 0xFF |
| S4 | 0xFF | 0xFF |
| S5 | 0xFF | 0xFF |
| S6 | 0xFF | 0xFF |
| ... | ... | ... |

620

| Group | Storage unit having last updated L2P mapping table |
|---|---|
| G1 | S1 |
| G2 | 0xFF |
| G3 | 0xFF |
| ... | ... |

FIG. 7

Write updated MT1025 into S2, and update 610 and 620

610

| Storage unit of host buffer | L2P mapping table | Previous storage unit corresponding to the same group |
|---|---|---|
| S1 | MT1 | 0xFF |
| S2 | MT1025 | 0xFF |
| S3 | 0xFF | 0xFF |
| S4 | 0xFF | 0xFF |
| S5 | 0xFF | 0xFF |
| S6 | 0xFF | 0xFF |
| ... | ... | ... |

620

| Group | Storage unit having last updated L2P mapping table |
|---|---|
| G1 | S1 |
| G2 | S2 |
| G3 | 0xFF |
| ... | ... |

FIG. 8

Write updated MT1026 into S3, and update 610 and 620

610

| Storage unit of host buffer | L2P mapping table | Previous storage unit corresponding to the same group |
|---|---|---|
| S1 | MT1 | 0xFF |
| S2 | MT1025 | 0xFF |
| S3 | MT1026 | S2 |
| S4 | 0xFF | 0xFF |
| S5 | 0xFF | 0xFF |
| S6 | 0xFF | 0xFF |
| ... | ... | ... |

620

| Group | Storage unit having last updated L2P mapping table |
|---|---|
| G1 | S1 |
| G2 | S3 |
| G3 | 0xFF |
| ... | ... |

FIG. 9

Write updated MT1027 into S4, and update 610 and 620

610

| Storage unit of host buffer | L2P mapping table | Previous storage unit corresponding to the same group |
|---|---|---|
| S1 | MT1 | 0xFF |
| S2 | MT1025 | 0xFF |
| S3 | MT1026 | S2 |
| S4 | MT1027 | S3 |
| S5 | 0xFF | 0xFF |
| S6 | 0xFF | 0xFF |
| ... | ... | ... |

620

| Group | Storage unit having last updated L2P mapping table |
|---|---|
| G1 | S1 |
| G2 | S4 |
| G3 | 0xFF |
| ... | ... |

FIG. 10

Write updated MT1028 into S5, and update 610 and 620

610

| Storage unit of host buffer | L2P mapping table | Previous storage unit corresponding to the same group |
|---|---|---|
| S1 | MT1 | 0xFF |
| S2 | MT1025 | 0xFF |
| S3 | MT1026 | S2 |
| S4 | MT1027 | S3 |
| S5 | MT1028 | S4 |
| S6 | 0xFF | 0xFF |
| ... | ... | ... |

620

| Group | Storage unit having last updated L2P mapping table |
|---|---|
| G1 | S1 |
| G2 | S5 |
| G3 | 0xFF |
| ... | ... |

FIG. 11

Write updated MT2 into S6, and update 610 and 620

610

| Storage unit of host buffer | L2P mapping table | Previous storage unit corresponding to the same group |
|---|---|---|
| S1 | MT1 | 0xFF |
| S2 | MT1025 | 0xFF |
| S3 | MT1026 | S2 |
| S4 | MT1027 | S3 |
| S5 | MT1028 | S4 |
| S6 | MT2 | S1 |
| ... | ... | ... |

620

| Group | Storage unit having last updated L2P mapping table |
|---|---|
| G1 | S6 |
| G2 | S5 |
| G3 | 0xFF |
| ... | ... |

FIG. 12

MEMORY DEVICE, FLASH MEMORY
CONTROLLER AND ASSOCIATED
CONTROL METHOD

BACKGROUND OF THE INVENTION

1. Field of the Invention

The present invention relates to a flash memory.

2. Description of the Prior Art

In a flash memory controller, multiple logical address to physical address mapping tables (L2P mapping tables) are established, wherein each L2P mapping table records multiple logical addresses and corresponding physical addresses, that is, each L2P mapping table records which physical address in the flash memory module the data with these logical addresses are stored in. However, as the capacity of flash memory modules increases rapidly, more and more L2P mapping tables need to be established by the flash memory controller. In addition, some electronic devices do not have dynamic random access memory (DRAM) in order to reduce costs, therefore, how to manage these increasing numbers of L2P mapping tables is an important issue.

SUMMARY OF THE INVENTION

It is therefore an objective of the present invention to provide a control method of a flash memory controller, which can effectively manage the L2P mapping tables, to solve the problems described in the prior art.

According to one embodiment of the present invention, a control method of a flash memory controller is disclosed, wherein the flash memory controller is coupled between a host device and a flash memory module. The control method comprises: dividing a plurality of L2P mapping tables into a plurality of groups, wherein the plurality of groups comprises at least a first group and a second group, and the first group comprises a plurality of first L2P mapping tables among a plurality of L2P mapping tables, and the second group comprises a plurality of second L2P mapping tables among the plurality of L2P mapping tables; receiving a plurality of data from the host device, and writing the plurality of data into the flash memory module; updating a portion of the first L2P mapping tables to generate an updated portion of the first L2P mapping tables according to logical addresses of the plurality of data, and updating a portion of the plurality of second L2P mapping tables to generate an updated portion of the second L2P mapping tables according to the logical addresses of the plurality of data; writing the updated portion of the first L2P mapping table and the updated portion of the second L2P mapping table to a host buffer in the host device; establishing a first G2P mapping table and a second G2P mapping table respectively corresponding to the first group and the second group, wherein the first G2P mapping table records the plurality of first L2P mapping tables and corresponding physical addresses; and the second G2P mapping table records the plurality of second L2P mapping tables and corresponding physical addresses; writing the first G2P mapping table and the second G2P mapping table into the host buffer; establishing a storage unit link relationship table and a last updated storage unit table, which record the L2P mapping tables stored in a plurality of storage units of the host buffer and the groups to which they belong; selecting the first group, reading the first G2P mapping table from the host buffer, and storing the first G2P mapping table in a buffer memory of the flash memory controller; reading the updated portion of the first L2P mapping tables corresponding to first group from the host buffer according to the storage unit link relationship table and the last updated storage unit table, and writing the updated portion of the first L2P mapping tables into a first physical address of the flash memory module; and updating the first G2P mapping table to make the updated portion of the first L2P mapping tables corresponds to the first physical address.

According to one embodiment of the present invention, a flash memory controller is disclosed, wherein the flash memory controller is configured to access a flash memory module, and the flash memory controller comprises a read-only memory and a microprocessor. The read-only memory is configured to store a program code. The microprocessor is configured to execute the program code to control access of the flash memory module. The microprocessor is configured to perform the steps of: dividing a plurality of L2P mapping tables into a plurality of groups, wherein the plurality of groups comprises at least a first group and a second group, and the first group comprises a plurality of first L2P mapping tables among a plurality of L2P mapping tables, and the second group comprises a plurality of second L2P mapping tables among the plurality of L2P mapping tables; receiving a plurality of data from the host device, and writing the plurality of data into the flash memory module; updating a portion of the first L2P mapping tables to generate an updated portion of the first L2P mapping tables according to logical addresses of the plurality of data, and updating a portion of the plurality of second L2P mapping tables to generate an updated portion of the second L2P mapping tables according to the logical addresses of the plurality of data; writing the updated portion of the first L2P mapping table and the updated portion of the second L2P mapping table to a host buffer in the host device; establishing a first G2P mapping table and a second G2P mapping table respectively corresponding to the first group and the second group, wherein the first G2P mapping table records the plurality of first L2P mapping tables and corresponding physical addresses; and the second G2P mapping table records the plurality of second L2P mapping tables and corresponding physical addresses; writing the first G2P mapping table and the second G2P mapping table into the host buffer; establishing a storage unit link relationship table and a last updated storage unit table, which record the L2P mapping tables stored in a plurality of storage units of the host buffer and the groups to which they belong; selecting the first group, reading the first G2P mapping table from the host buffer, and storing the first G2P mapping table in a buffer memory of the flash memory controller; reading the updated portion of the first L2P mapping tables corresponding to first group from the host buffer according to the storage unit link relationship table and the last updated storage unit table, and writing the updated portion of the first L2P mapping tables into a first physical address of the flash memory module; and updating the first G2P mapping table to make the updated portion of the first L2P mapping tables corresponds to the first physical address.

According to one embodiment of the present invention, a memory device comprising a flash memory module and a flash memory controller is disclosed. The flash memory controller is configured to perform the steps of: dividing a plurality of L2P mapping tables into a plurality of groups, wherein the plurality of groups comprises at least a first group and a second group, and the first group comprises a plurality of first L2P mapping tables among a plurality of L2P mapping tables, and the second group comprises a plurality of second L2P mapping tables among the plurality of L2P mapping tables; receiving a plurality of data from the host device, and writing the plurality of data into the flash memory module; updating a portion of the first L2P mapping tables to generate an updated portion of the first L2P mapping tables according to logical addresses of the plurality of data, and updating a portion of the plurality of second L2P mapping tables to generate an updated portion of the second L2P mapping tables according to the logical addresses of the plurality of data; writing the updated portion of the first L2P mapping table and the updated portion of the second L2P mapping table to a host buffer in the host device; establishing a first G2P mapping table and a second G2P mapping table respectively corresponding to the first group and the second group, wherein the first G2P mapping table records the plurality of first L2P mapping tables and corresponding physical addresses; and the second G2P mapping table records the plurality of second L2P mapping tables and corresponding physical addresses; writing the first G2P mapping table and the second G2P mapping table into the host buffer; establishing a storage unit link relationship table and a last updated storage unit table, which record the L2P mapping tables stored in a plurality of storage units of the host buffer and the groups to which they belong; selecting the first group, reading the first G2P mapping table from the host buffer, and storing the first G2P mapping table in a buffer memory of the flash memory controller; reading the updated portion of the first L2P mapping tables corresponding to first group from the host buffer according to the storage unit link relationship table and the last updated storage unit table, and writing the updated portion of the first L2P mapping tables into a first physical address of the flash memory module; and updating the first G2P mapping table to make the updated portion of the first L2P mapping tables corresponds to the first physical address.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 6 is a diagram of a storage unit link relationship table and a last updated storage unit table according to one embodiment of the present invention.

FIG. 7 is a diagram of updating the L2P mapping table, the storage unit link relationship table and the last updated storage unit table according to one embodiment of the present invention.

FIG. 8 is a diagram of updating the L2P mapping table, the storage unit link relationship table and the last updated storage unit table according to one embodiment of the present invention.

FIG. 9 is a diagram of updating the L2P mapping table, the storage unit link relationship table and the last updated storage unit table according to one embodiment of the present invention.

FIG. 10 is a diagram of updating the L2P mapping table, the storage unit link relationship table and the last updated storage unit table according to one embodiment of the present invention.

FIG. 11 is a diagram of updating the L2P mapping table, the storage unit link relationship table and the last updated storage unit table according to one embodiment of the present invention.

FIG. 12 is a diagram of updating the L2P mapping table, the storage unit link relationship table and the last updated storage unit table according to one embodiment of the present invention.

DETAILED DESCRIPTION

Figure 1:
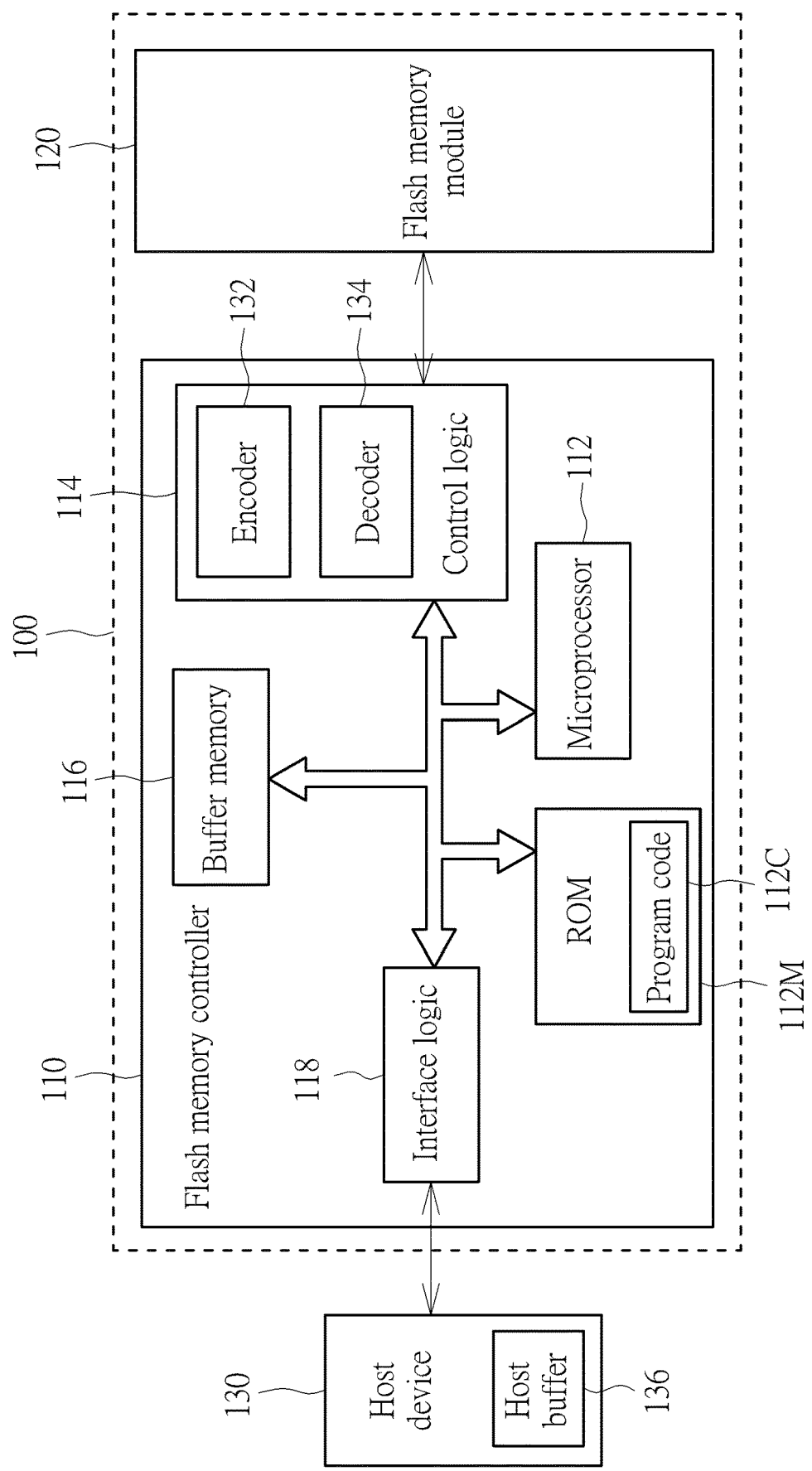
FIG. 1 is diagram illustrating a memory device according to one embodiment of the present invention.

FIG. 1 is a diagram illustrating a memory device 100 according to one embodiment of the present invention. The memory device 100 includes a flash memory module 120 and a flash memory controller 110, wherein the flash memory controller 110 is arranged to access the flash memory module 120. The flash memory controller 110 includes a microprocessor 112, a read only memory (ROM) 112M, a control logic 114, a buffer memory 116, and an interface logic 118. The ROM 112M is arranged to store a program code 112C, and the microprocessor 112 is arranged to execute the program code 112C to control access of the flash memory module 120. The control logic 114 includes an encoder 132 and a decoder 134, wherein the encoder 132 is arranged to encode data that is written into the flash memory module 120 to generate a corresponding parity (also known as an error correction code (ECC)), and the decoder 134 is arranged to decode data that is read from the flash memory module 120.

In a general situation, the flash memory module 120 includes a plurality of flash memory chips, and each flash memory chip includes a plurality of blocks. A controller (e.g. the flash memory controller 110 that executes the program code 112C through the microprocessor 112) may copy, erase, and merge data for the flash memory module 120 with a block as a unit. In addition, a block can record a specific number of pages, wherein the controller (e.g. the flash memory controller 110 that executes the program code 112C through the microprocessor 112) may perform a data write operation upon the flash memory module 120 with a page as a unit. In other words, a block is the smallest erase unit in the flash memory module 120, and a page is the smallest write unit in the flash memory module 120.

In practice, the flash memory controller 110 that executes the program code 112C through the microprocessor 112 may utilize its own internal components to perform many control operations. For example, the flash memory controller 122 utilizes the control logic 114 to control access of the flash memory module 120 (more particularly, access at least one block or at least one page), utilizes the buffer memory 116 to perform a required buffering operation, and utilizes the interface logic 118 to communicate with a host device 130.

In one embodiment, the memory device 100 may be a portable memory device such as a memory card which conforms to one of the SD/MMC, CF, MS and XD specifications, and the host device 130 is an electronic device able to be connected to the memory device 100, such as a cellphone, a laptop, a desktop computer, etc. In another embodiment, the memory device 100 can be a solid state drive (SSD) or an embedded storage device conforming to the universal flash storage (UFS) or embedded multi-media card (EMMC) specifications, and can be arranged in an electronic device. For example, the memory device 100 can be arranged in a cellphone, a watch, a portable medical testing device (e.g. a medical wristband), a laptop, or a desktop computer. In this case, the host device 130 can be a processor of the electronic device.

When the host device 130 needs to write data to the memory device 100, the host device 130 will send a write command to the flash memory controller 110, where the write command includes logical addresses (or logical block address (LBA)) of one or more data to be written, and each logical address corresponds to a specific amount of data, such as 4 kilobytes (KB) of data. After receiving the write command, the flash memory controller 110 will obtain the data corresponding to the write command from the host device 130, and write the data to a physical address of the flash memory module 120, where the physical address is which page of which block in the flash memory module 120. In addition, after the flash memory controller 110 writes the data to the flash memory module 120, the microprocessor 112 in the flash memory controller 110 will update one or more L2P mapping tables to record the mapping relationship between the logical address included in the write command and the physical address storing the data corresponding to the write command.

Figure 2:
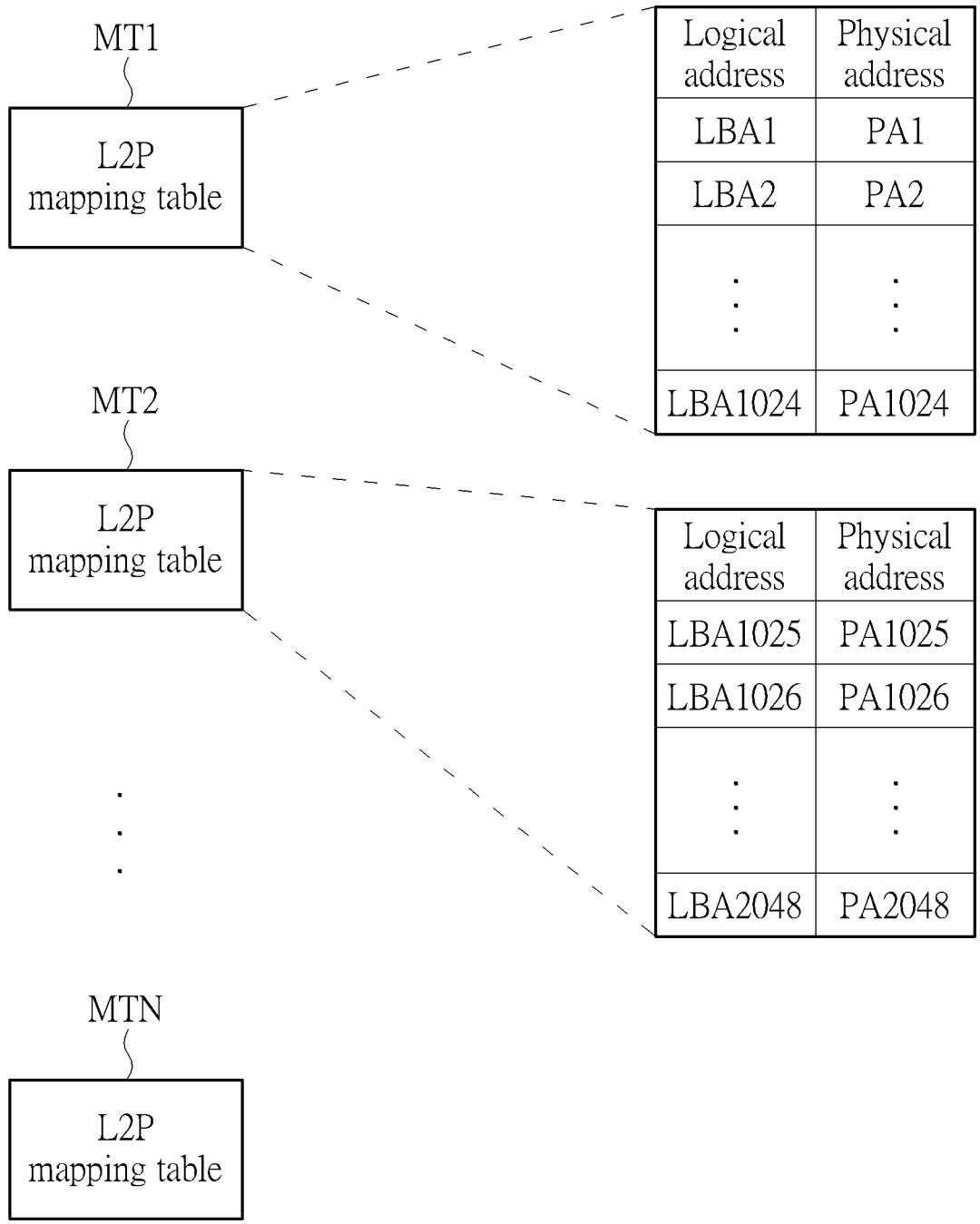
FIG. 2 is a diagram illustrating multiple L2P mapping tables according to one embodiment of the present invention.

FIG. 2 is a diagram illustrating multiple L2P mapping tables according to one embodiment of the present invention. This embodiment shows L2P mapping tables MT1-MTN, where each L2P mapping table includes a certain number of continuous logical addresses, for example, a L2P mapping table MT1 includes logical addresses LBA1-LBA1024, a L2P mapping table MT2 includes logical addresses LBA1025-LBA2048, ... and so on. It is noted that the L2P mapping table in FIG. 2 shows logical addresses LBA1-LBA1024 corresponding to physical addresses PA1-PA1024 respectively, however, if the flash memory module 120 does not contain data corresponding to one logical address, the corresponding physical address may be empty or invalid information. For example, assume that the flash memory controller 110 writes data with logical addresses LBA1 and LBA2 to a first page of a first block in the flash memory module 120, and if the data with logical addresses LBA3-LBA1024 is not written, the microprocessor 112 can update the L2P mapping table MT1 to update PA1 and PA2 to point to the first page of the first block of the flash memory module 120. At this time, PA3-PA1024 are empty or invalid information.

In addition, as the capacity of the flash memory module 120 increases rapidly, the amount of data that the memory device 100 can store is also increasing. Therefore, the number of L2P mapping tables that the microprocessor 112 needs to process is also increasing, and these L2P mapping tables will be stored in the buffer memory 116, a host buffer 136 in the host device 130, or the flash memory module 120 according to the design of the memory device 100. Specifically, due to the limited capacity and high price of the buffer memory 116, the microprocessor 112 will only load the L2P mapping table that currently needs to be used into the buffer memory 116, and the L2P mapping tables that are not needed temporarily are stored in the host buffer 136 in the host device 130. In addition, since the capacity of the host buffer 136 in the host device 130 is also limited, if the capacity of the host buffer 136 is insufficient, a part of the temporarily stored L2P mapping table needs to be written to the flash memory module 120 through the flash memory controller 110, to release space in the host buffer 136. In this embodiment, most of the L2P mapping tables will be stored in the flash memory module 120, and the microprocessor 112 will read the L2P mapping table that needs to be used from the flash memory module 120, and the L2P mapping table(s) read from the flash memory module 120 is/are temporarily stored in the buffer memory 116 or the host buffer 136 of the host device 130.

Figure 3:
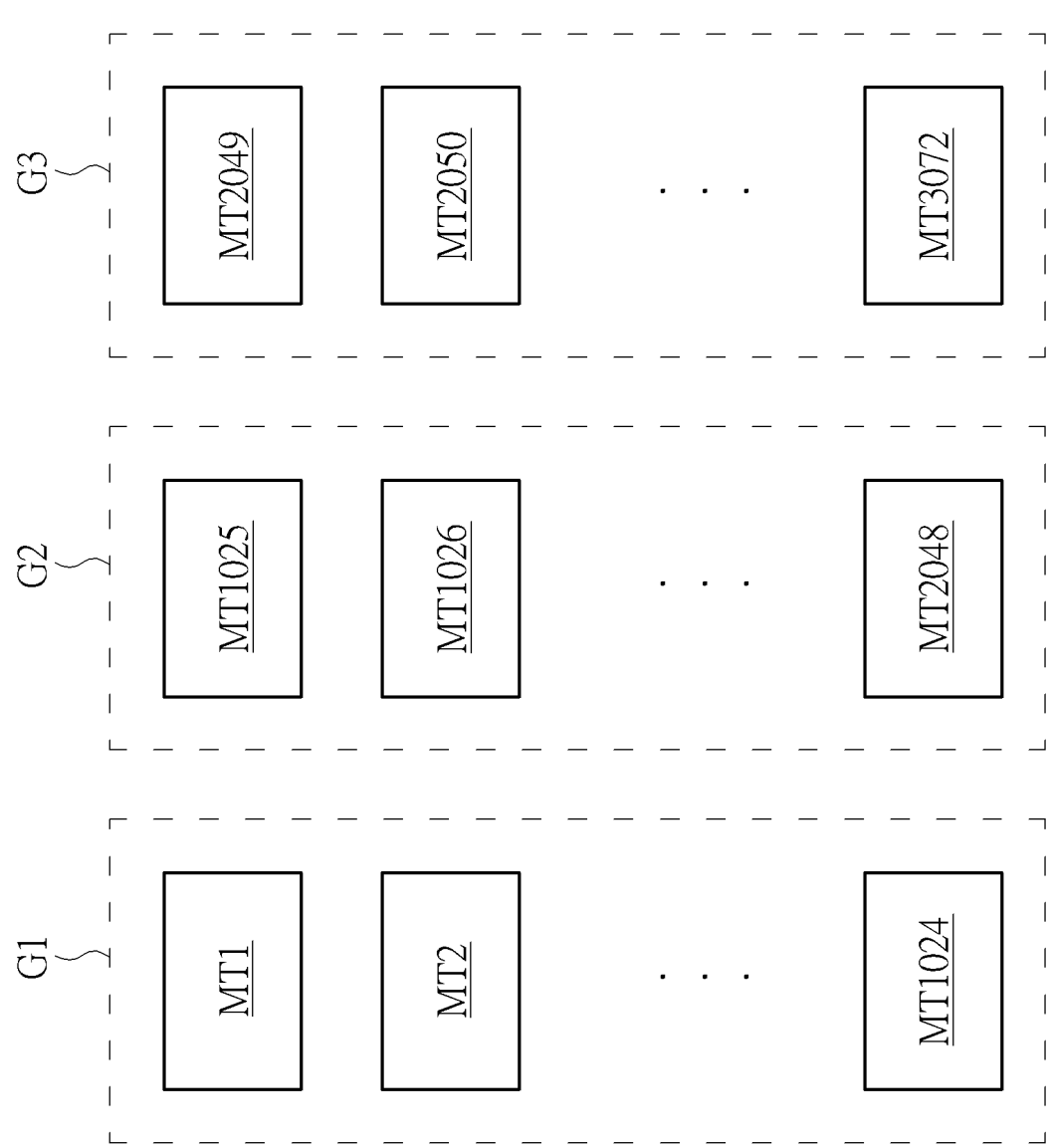
FIG. 3 is a diagram of grouping multiple L2P mapping tables according to one embodiment of the present invention.
Figure 4:
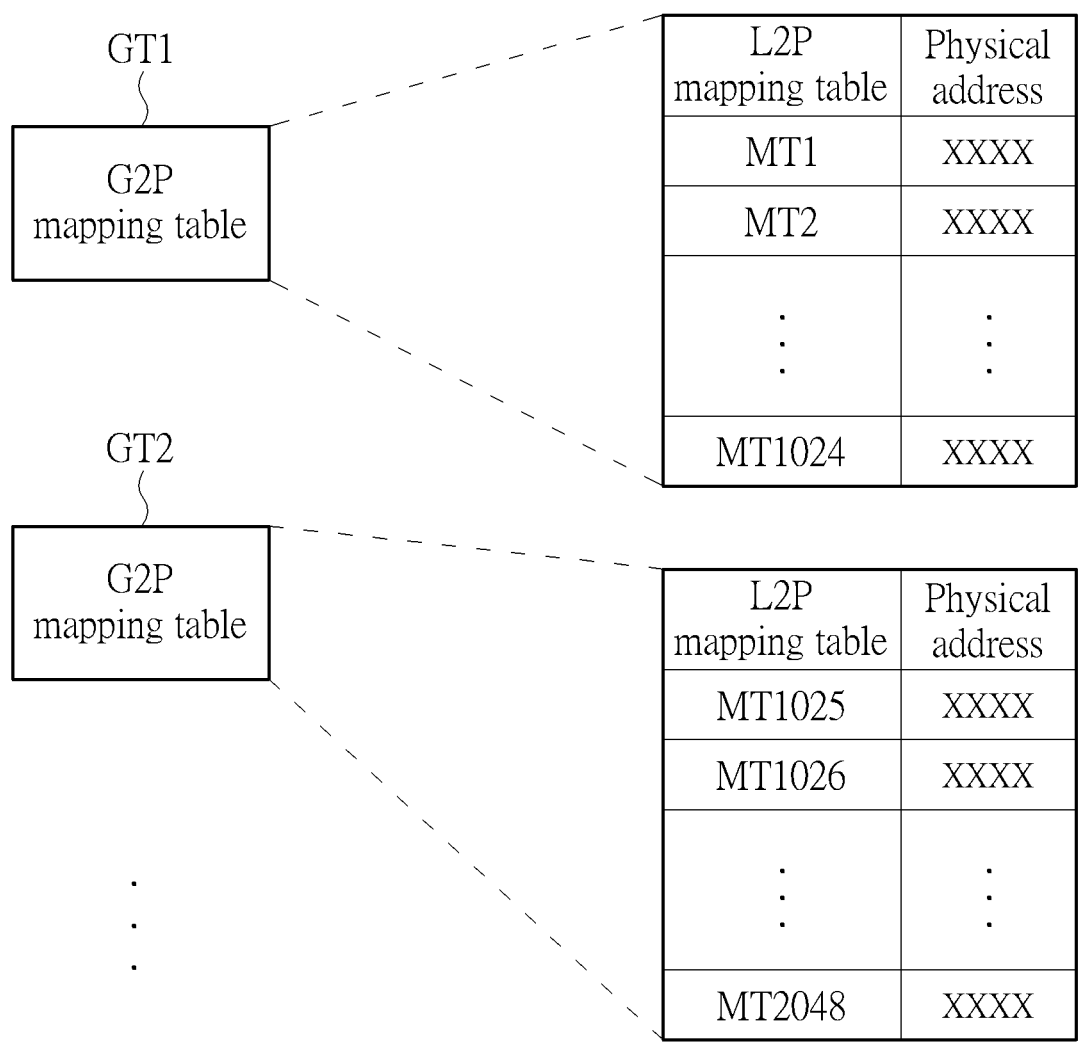
FIG. 4 is a diagram illustrating multiple G2P mapping tables according to one embodiment of the present invention.

Since there are a large number of L2P mapping tables, in order to facilitate management, this embodiment groups the L2P mapping tables MT1-MTN, so that each group includes multiple L2P mapping tables. Taking FIG. 3 as an example, not a limitation of the present invention, each group can include 1024 L2P mapping tables, where a group G1 includes L2P mapping tables MT1-MT1024, a group G2 includes L2P mapping tables MT1025-MT2048, and a group G3 includes L2P mapping tables MT2049-MT3072, ... and so on. In addition, since part of the L2P mapping table will be moved to the flash memory module 120, the microprocessor 112 additionally establishes multiple group to physical address mapping table (G2P mapping table), where each G2P mapping table includes the L2P mapping tables included in the group and the physical address of the flash memory module 120 storing these L2P mapping tables. Specifically, referring to FIG. 4, the G2P mapping table GT1 includes multiple L2P mapping tables MT1-MT1024 of the group G1 and the corresponding physical addresses, and the G2P mapping table GT2 includes multiple L2P mapping tables MT1025-MT2048 of the group G2 and the corresponding physical addresses, ... and so on. Specifically, the physical address corresponding to the L2P mapping table MT1 is the physical address of the flash memory module 120 storing the L2P mapping table MT1 (that is, which page and which block storing the L2P mapping table MT1), the physical address corresponding to the L2P mapping table MT2 is the physical address of the flash memory module 120 storing the L2P mapping table MT2, ... and so on.

In addition, since the number of G2P mapping tables will not be too many, all G2P mapping tables can be temporarily stored in the host buffer 136. When one of the G2P mapping tables needs to be updated, the host buffer 136 will move it to the buffer memory 116.

Figure 5:
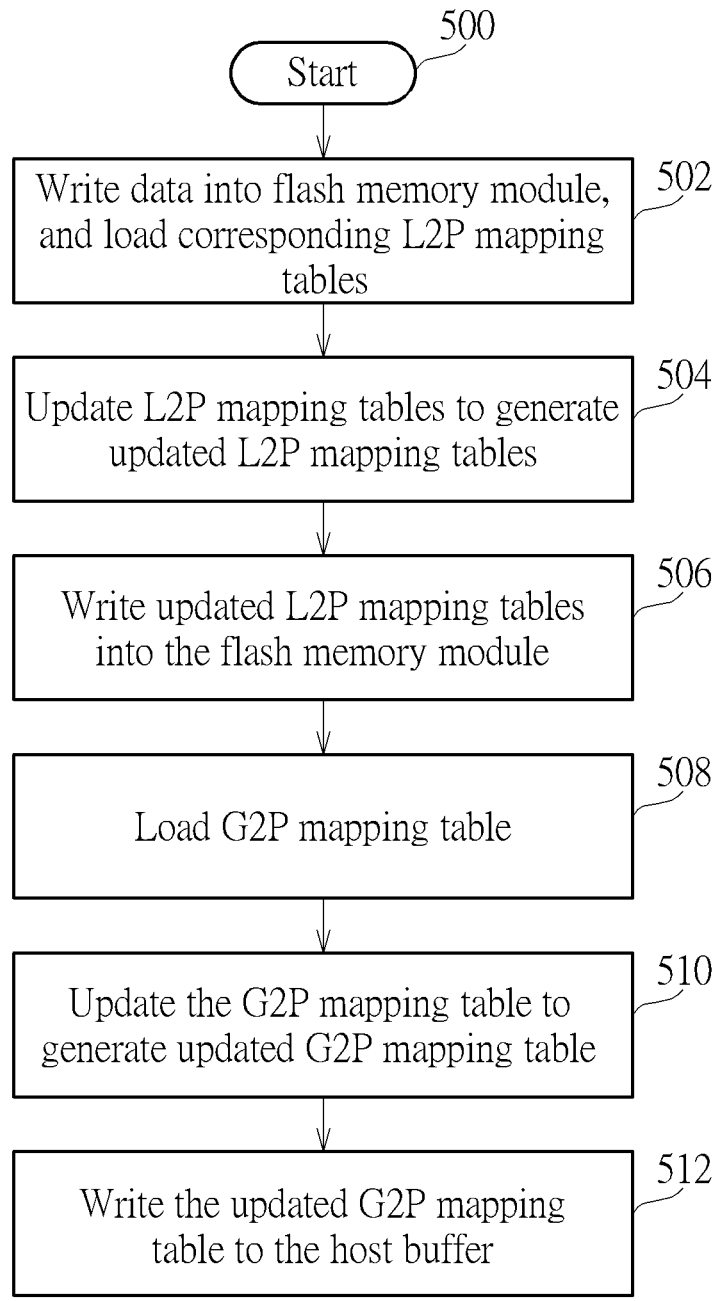
FIG. 5 is a flowchart of a control method of a flash memory controller according to one embodiment of the present invention.

FIG. 5 is a flowchart of a control method of the flash memory controller 110 according to one embodiment of the present invention. In Step 500, the flow starts, and all G2P mapping tables and part of the L2P mapping tables are stored in the host buffer 136. In Step 502, the flash memory controller 110 writes data into the flash memory module 120, wherein the data written therein may be from the host device 130 or from the flash memory during a garbage collection operation. In addition, due to the data writing, the microprocessor 112 loads the corresponding L2P mapping table from the host buffer 136 to the buffer memory 116 according to the logical address of the written data. For example, if the data written by the microprocessor 112 has logical addresses LBA4 and LBA1026, then because the logical addresses LBA4 and LBA1026 belong to the L2P mapping tables MT1 and MT2 respectively, the microprocessor 112 will move/copy the L2P mapping tables MT1 and MT2 from the host buffer 136 to the buffer memory 116. In Step 504, the microprocessor 112 updates the L2P mapping table according to the written data to generate an updated L2P mapping table. For example, if the microprocessor 112 writes the data with the logical address LBA4 to a specific physical address of the flash memory module 120, the microprocessor 112 updates the L2P mapping table MT1 so that the physical address PA4 corresponding to the logical address LBA4 points to the specific physical address. In addition, the updated L2P mapping table can be written back to the host buffer 136.

In Step 506, assuming that the space of the host buffer 136 is insufficient or there are other factors, the microprocessor 112 writes the updated L2P mapping table into the flash memory module 120.

Since the updated L2P mapping table is written to the flash memory module 120, it means that the information in the G2P mapping table corresponding to the updated L2P mapping table is no longer correct. Therefore, in Step 508, the microprocessor 112 loads the G2P mapping table corresponding to the updated L2P mapping table from the host buffer 136 to the buffer memory 116. For example, if the updated L2P mapping table includes MT1 and MT1026, the microprocessor 112 needs to load the G2P mapping table GT1 including the L2P mapping table MT1 and the G2P mapping table GT2 including the L2P mapping table MT1026 to the buffer memory 116.

In Step 510, the microprocessor 112 updates the G2P mapping table according to the physical address of the flash memory module 120 storing the updated L2P mapping table, to generate an updated G2P mapping table. For example, if the microprocessor 112 writes the L2P mapping table MT1 (updated L2P mapping table MT1) into a specific physical address of the flash memory module 120, the microprocessor 112 updates the G2P mapping table GT1 so that the L2P mapping table MT1 corresponds to the specific physical address.

In Step 512, considering that the space in the buffer memory 116 is limited, the microprocessor 112 moves the updated G2P mapping table to the host buffer 136 to release the space in the buffer memory 116.

In Step 504 and Step 506 of FIG. 5, the microprocessor 112 can update multiple L2P mapping tables, and write multiple updated L2P mapping tables to the host buffer 136, and when there is insufficient space in the host buffer 136 or other factors, the multiple updated L2P mapping tables are moved from the host buffer 136 to the flash memory module 120. In this case, since the buffer memory 116 may not be able to load two G2P mapping tables at the same time, it is possible that the G2P mapping table needs to be repeatedly moved between the host memory 136 and the buffer memory 116 if the multiple updated L2P mapping tables belong to different groups. For example, assuming that the microprocessor 112 writes the L2P mapping tables MT1, MT1025 and MT2 to the flash memory module 120 in sequence, the microprocessor 112 needs to load the G2P mapping table GT1 into the buffer memory 116 updates the physical address of the L2P mapping table MT1 first. Then, the G2P mapping table GT1 is written back to the host memory 136, and the G2P mapping table GT2 is loaded into the buffer memory 116 to update the physical address the L2P mapping table MT1025. Finally, the G2P mapping table GT2 is written back to the host memory 136, and the G2P mapping table GT1 is loaded into the buffer memory 116 to update the physical address of the L2P mapping table MT2. The above mechanism will affect the performance of the flash memory controller 110.

In order for the microprocessor 112 to efficiently update the G2P mapping table when writing multiple L2P mapping tables into the flash memory module 120, the microprocessor 112 establishes a storage unit link relationship table 610 and a last updated storage unit table 620 in the buffer memory 116 as shown in FIG. 6. The storage unit link relationship table 610 includes at least three columns, which are respectively the storage unit of the host buffer 136, the L2P mapping table, and the previous storage unit corresponding to the same group. Specifically, the host memory 136 is allocated an area to store the L2P mapping table, where each storage unit in this area can be used to store a single L2P mapping table, and the first field S1-S6 represents the index of the storage unit. The second column represents the L2P mapping table stored in the storage unit in the same row, and the third column represents the previous storage unit corresponding to the same group. The last updated storage unit table 620 includes at least two columns, where the first column records the group indexes, and the second column records the storage unit with the last updated L2P mapping table in the corresponding group. In addition, the storage unit link relationship table 610 and the last updated storage unit table 620 shown in FIG. 6 are in the initial state, that is, the value of each field is "0xFF".

The following embodiments shown in FIG. 7-FIG. 12 are used to illustrate that the microprocessor 112 sequentially updates the L2P mapping tables MT1, MT1025, MT1026, MT1027, MT1028 and MT2 to update some of the logical addresses and physical address, and further used to show the updated content of the storage unit link relationship table 610 and the last updated storage unit table 620 when writing the updated L2P mapping tables MT1, MT1025, MT1026, MT1027, MT1028 and MT2 back to the host buffer 136.

Referring to FIG. 7, the microprocessor 112 writes the data with the logical address located in the L2P mapping table MT1 into the flash memory module 120, and updates the L2P mapping table MT1 according to the physical address of the flash memory module 120 storing the data, and writes the updated L2P mapping table MT1 into the storage unit S1 of the host buffer 136. At this time, the microprocessor 112 updates the storage unit link relationship table 610 to record the L2P mapping table corresponding to the storage unit S1 as "MT1". In addition, since the L2P mapping table MT1 belongs to the group G1, the microprocessor 112 also updates the last updated storage unit table 620 to record the storage unit storing the last updated L2P mapping table corresponding to the group G1 as "S1".

Then, referring to FIG. 8, the microprocessor 112 writes the data with the logical address located in the L2P mapping table MT1025 into the flash memory module 120, and updates the L2P mapping table MT1025 according to the physical address of the flash memory module 120 storing the data, and writes the updated L2P mapping table MT1025 into the storage unit S2 of the host buffer 136. At this time, the microprocessor 112 updates the storage unit link relationship table 610 to record the L2P mapping table corresponding to the storage unit S2 as "MT1025". In addition, since the L2P mapping table MT1025 belongs to the group G2, the microprocessor 112 also updates the last updated storage unit table 620 to record the storage unit storing the last updated L2P mapping table corresponding to the group G2 as "S2".

Then, referring to FIG. 9, the microprocessor 112 writes the data with the logical address located in the L2P mapping table MT1026 into the flash memory module 120, and updates the L2P mapping table MT1026 according to the physical address of the flash memory module 120 storing the data, and writes the updated L2P mapping table MT1026 into the storage unit S3 of the host buffer 136. At this time, the microprocessor 112 updates the storage unit link relationship table 610 to record the L2P mapping table corresponding to the storage unit S3 as "MT1026", and updates the previous storage unit corresponding to the same group corresponding to the storage unit S3 as "S2" according to the current last updated storage unit table 620 shown in FIG. 8. In addition, since the L2P mapping table MT1026 belongs to the group G2, the microprocessor 112 also updates the last updated storage unit table 620 to record the storage unit storing the last updated L2P mapping table corresponding to the group G2 as "S3".

Then, referring to FIG. 10, the microprocessor 112 writes the data with the logical address located in the L2P mapping table MT1027 into the flash memory module 120, and updates the L2P mapping table MT1027 according to the physical address of the flash memory module 120 storing the data, and writes the updated L2P mapping table MT1027 into the storage unit S4 of the host buffer 136. At this time, the microprocessor 112 updates the storage unit link relationship table 610 to record the L2P mapping table corresponding to the storage unit S4 as "MT1027", and updates the previous storage unit corresponding to the same group corresponding to the storage unit S4 as "S3" according to the current last updated storage unit table 620 shown in FIG. 9. In addition, since the L2P mapping table MT1027 belongs to the group G2, the microprocessor 112 also updates the last updated storage unit table 620 to record the storage unit storing the last updated L2P mapping table corresponding to the group G2 as "S4".

Then, referring to FIG. 11, the microprocessor 112 writes the data with the logical address located in the L2P mapping table MT1028 into the flash memory module 120, and updates the L2P mapping table MT1028 according to the physical address of the flash memory module 120 storing the data, and writes the updated L2P mapping table MT1028 into the storage unit S5 of the host buffer 136. At this time, the microprocessor 112 updates the storage unit link relationship table 610 to record the L2P mapping table corresponding to the storage unit S5 as "MT1028", and updates the previous storage unit corresponding to the same group corresponding to the storage unit S5 as "S4" according to the current last updated storage unit table 620 shown in FIG. 10. In addition, since the L2P mapping table MT1028 belongs to the group G2, the microprocessor 112 also updates the last updated storage unit table 620 to record the storage unit storing the last updated L2P mapping table corresponding to the group G2 as "S5".

Then, referring to FIG. 12, the microprocessor 112 writes the data with the logical address located in the L2P mapping table MT2 into the flash memory module 120, and updates the L2P mapping table MT2 according to the physical address of the flash memory module 120 storing the data, and writes the updated L2P mapping table MT2 into the storage unit S6 of the host buffer 136. At this time, the microprocessor 112 updates the storage unit link relationship table 610 to record the L2P mapping table corresponding to the storage unit S6 as "MT2", and updates the previous storage unit corresponding to the same group corresponding to the storage unit S6 as "S1" according to the current last updated storage unit table 620 shown in FIG. 11. In addition, since the L2P mapping table MT2 belongs to the group G1, the microprocessor 112 also updates the last updated storage unit table 620 to record the storage unit storing the last updated L2P mapping table corresponding to the group G1 as "S6".

Figure 13:
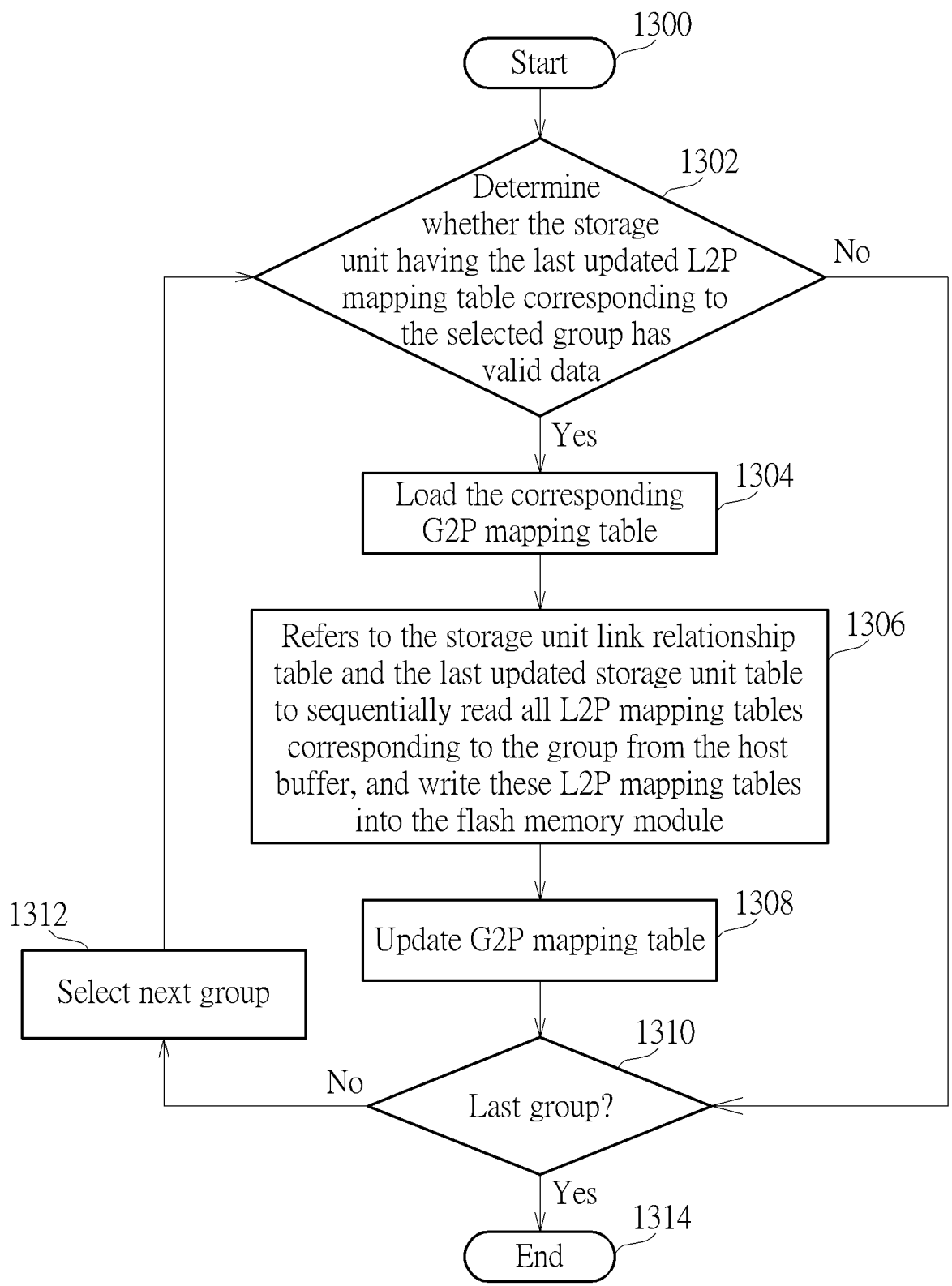
FIG. 13 is a flowchart of a control method of a flash memory controller according to one embodiment of the present invention.

When the space of the host buffer 136 is insufficient or there are other factors, the microprocessor 112 will need to write the L2P mapping tables MT1, MT1025, MT1026, MT1027, MT1028 and MT2 in the host buffer 136 to the flash memory module 120. FIG. 13 is a flowchart of a control method of a flash memory controller according to one embodiment of the present invention. In Step 1300, the flow starts. In Step 1302, the microprocessor 112 determines whether the storage unit having the last updated L2P mapping table corresponding to the selected group (initially group G1) has valid data according to the last updated storage unit table 620, if yes, the flow enters Step 1304; and if not, the flow enters Step 1310.

In Step 1304, the microprocessor 112 loads the G2P mapping table GT1 corresponding to the group G1 from the host buffer 136 and temporarily stores it in the buffer memory 116.

In Step 1306, the microprocessor 112 refers to the storage unit link relationship table 610 and the last updated storage unit table 620 to sequentially read all L2P mapping tables corresponding to the group G1 from the host buffer 136. Specifically, referring to FIG. 12, the microprocessor 112 can know that the storage unit having the last updated L2P mapping table corresponding to the group G1 is "S6" according to the last updated storage unit table 620, and then knows that the previous storage unit of the storage unit S6 corresponding to the same group is "S1" according to the storage unit link relationship table 610. Therefore, the microprocessor 112 sequentially reads the L2P mapping tables MT2 and MT1 from the storage units S6 and S1, and writes the L2P mapping tables MT2 and MT1 to a first physical address of the flash memory module 120.

In Step 1308, the microprocessor 112 updates the G2P mapping table GT1 to update the L2P mapping table MT2 and MT1 to correspond to the first physical address, to generate an updated G2P mapping table GT1.

In Step 1310, the microprocessor 112 determines whether the currently processed group is the last group according to the last updated storage unit table 620, it yes, the flow enters Step 1314 to end the operation; and if not, the flow enters Step 1312 to select the next group.

In this embodiment, since the currently processed group is not the last group, the flow goes back to Step 1302 to continue processing group G2. Specifically, in Step 1304, the microprocessor 112 writes the G2P mapping table GT1 back to the host buffer 136 to release the space of the buffer memory 116, and the microprocessor 112 loads the G2P mapping table GT2 corresponding to the group G2 from the host buffer 136, and temporarily stores the G2P mapping table GT2 in buffer memory 116. In Step 1306, the microprocessor 112 refers to the storage unit link relationship table 610 and the last updated storage unit table 620 to sequentially read all L2P mapping tables corresponding to the group G2 from the host buffer 136. Specifically, referring to FIG. 12, the microprocessor 112 can know that the storage unit having the last updated L2P mapping table corresponding to the group G2 is "S5" according to the last updated storage unit table 620, and then knows that the previous storage unit of the storage unit S5 corresponding to the same group is "S4", the previous storage unit of the storage unit S4 corresponding to the same group is "S3", the previous storage unit of the storage unit S3 corresponding to the same group is "S2", and the previous storage unit of the storage unit S2 corresponding to the same group is invalid data according to the storage unit link relationship table 610. Therefore, the microprocessor 112 sequentially reads the L2P mapping tables MT1028, MT1027, MT1026 and MT1025 from the storage units S5, S4, S3 and S2, and writes the L2P mapping tables MT1028, MT1027, MT1026 and MT1025 to a second physical address of the flash memory module 120. In Step 1308, the microprocessor 112 updates the G2P mapping table GT2 to update the L2P mapping table MT1028, MT1027, MT1026 and MT1025 to correspond to the second physical address, to generate an updated G2P mapping table GT2.

As described in the flow of FIG. 13, the microprocessor 112 knows the storage units of the host buffer 136 storing all L2P mapping tables belonging to the same group according to the storage unit link relationship table 610 and the last updated storage unit table 620, so that the microprocessor 112 can continuously read and write all L2P mapping tables belonging to the same group from the host buffer 136 to the flash memory module 120. In this way, the G2P mapping table corresponding to each group only needs to be loaded into the buffer memory 116 once to complete all updates to the physical addresses of the L2P mapping table, so the efficiency of the flash memory controller 110 can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method of a flash memory controller, wherein the flash memory controller is coupled between a host device and a flash memory module, and the control method comprises:
dividing a plurality of logical address to physical address (L2P) mapping tables into a plurality of groups, wherein the plurality of groups comprises at least a first group and a second group, and the first group comprises a plurality of first L2P mapping tables among a plurality of L2P mapping tables, and the second group comprises a plurality of second L2P mapping tables among the plurality of L2P mapping tables;
receiving a plurality of data from the host device, and writing the plurality of data into the flash memory module;
updating a portion of the first L2P mapping tables to generate an updated portion of the first L2P mapping tables according to logical addresses of the plurality of data, and updating a portion of the plurality of second L2P mapping tables to generate an updated portion of the second L2P mapping tables according to the logical addresses of the plurality of data;
writing the updated portion of the first L2P mapping table and the updated portion of the second L2P mapping table to a host buffer in the host device;
establishing a first group to physical address (G2P) mapping table and a second G2P mapping table respectively corresponding to the first group and the second group, wherein the first G2P mapping table records the plurality of first L2P mapping tables and corresponding physical addresses; and the second G2P mapping table records the plurality of second L2P mapping tables and corresponding physical addresses;
writing the first G2P mapping table and the second G2P mapping table into the host buffer;
establishing a storage unit link relationship table and a last updated storage unit table, which record the L2P mapping tables stored in a plurality of storage units of the host buffer and the groups to which they belong;
selecting the first group, reading the first G2P mapping table from the host buffer, and storing the first G2P mapping table in a buffer memory of the flash memory controller;
reading the updated portion of the first L2P mapping tables corresponding to first group from the host buffer according to the storage unit link relationship table and the last updated storage unit table, and writing the updated portion of the first L2P mapping tables into a first physical address of the flash memory module; and
updating the first G2P mapping table to make the updated portion of the first L2P mapping tables corresponds to the first physical address.

2. The control method of claim 1, further comprising:
selecting the second group, moving the first G2P mapping table from the buffer memory to the host buffer, reading the second G2P mapping table from the host buffer, and storing the second G2P mapping table into the buffer memory of the flash memory controller;
reading the updated portion of the second L2P mapping tables corresponding to second group from the host buffer according to the storage unit link relationship table and a last updated storage unit table, and writing the updated portion of the second L2P mapping tables into a second physical address of the flash memory module; and
updating the second G2P mapping table to make the updated portion of the second L2P mapping tables corresponds to the second physical address.

3. The control method of claim 1, wherein the storage unit link relationship table comprises the plurality of storage units of the host buffer, the L2P mapping table stored in each storage unit, and a previous storage unit of each storage unit corresponding to the same group.

4. The control method of claim 3, wherein for each group, the last updated storage unit table records the storage unit storing a last updated L2P mapping table in the corresponding group.

5. A flash memory controller, wherein the flash memory controller is configured to access a flash memory module, and the flash memory controller comprises:
a read-only memory, configured to store a program code; and
a microprocessor, configured to execute the program code to control access of the flash memory module;
wherein the microprocessor is configured to perform the steps of:
dividing a plurality of logical address to physical address (L2P) mapping tables into a plurality of groups, wherein the plurality of groups comprises at least a first group and a second group, and the first group comprises a plurality of first L2P mapping tables among a plurality of L2P mapping tables, and the second group comprises a plurality of second L2P mapping tables among the plurality of L2P mapping tables;
receiving a plurality of data from a host device, and writing the plurality of data into the flash memory module;
updating a portion of the first L2P mapping tables to generate an updated portion of the first L2P mapping tables according to logical addresses of the plurality of data, and updating a portion of the plurality of second L2P mapping tables to generate an updated portion of the second L2P mapping tables according to the logical addresses of the plurality of data;

writing the updated portion of the first L2P mapping table and the updated portion of the second L2P mapping table to a host buffer in the host device;

establishing a first group to physical address (G2P) mapping table and a second G2P mapping table respectively corresponding to the first group and the second group, wherein the first G2P mapping table records the plurality of first L2P mapping tables and corresponding physical addresses; and the second G2P mapping table records the plurality of second L2P mapping tables and corresponding physical addresses;

writing the first G2P mapping table and the second G2P mapping table into the host buffer;

establishing a storage unit link relationship table and a last updated storage unit table, which record the L2P mapping tables stored in a plurality of storage units of the host buffer and the groups to which they belong;

selecting the first group, reading the first G2P mapping table from the host buffer, and storing the first G2P mapping table in a buffer memory of the flash memory controller;

reading the updated portion of the first L2P mapping tables corresponding to first group from the host buffer according to the storage unit link relationship table and the last updated storage unit table, and writing the updated portion of the first L2P mapping tables into a first physical address of the flash memory module; and updating the first G2P mapping table to make the updated portion of the first L2P mapping tables corresponds to the first physical address.

6. The flash memory controller of claim 5, further comprising:

selecting the second group, moving the first G2P mapping table from the buffer memory to the host buffer, reading the second G2P mapping table from the host buffer, and storing the second G2P mapping table into the buffer memory of the flash memory controller;

reading the updated portion of the second L2P mapping tables corresponding to second group from the host buffer according to the storage unit link relationship table and a last updated storage unit table, and writing the updated portion of the second L2P mapping tables into a second physical address of the flash memory module; and updating the second G2P mapping table to make the updated portion of the second L2P mapping tables corresponds to the second physical address.

7. The flash memory controller of claim 5, wherein the storage unit link relationship table comprises the plurality of storage units of the host buffer, the L2P mapping table stored in each storage unit, and a previous storage unit of each storage unit corresponding to the same group.

8. The flash memory controller of claim 7, wherein for each group, the last updated storage unit table records the storage unit storing a last updated L2P mapping table in the corresponding group.

9. A memory device, comprising:
a flash memory module; and
a flash memory controller, configured to access the flash memory module;
wherein the flash memory controller is configured to perform the steps of:
dividing a plurality of logical address to physical address (L2P) mapping tables into a plurality of groups, wherein the plurality of groups comprises at least a first group and a second group, and the first group comprises a plurality of first L2P mapping tables among a plurality of L2P mapping tables, and the second group comprises a plurality of second L2P mapping tables among the plurality of L2P mapping tables;

receiving a plurality of data from a host device, and writing the plurality of data into the flash memory module;

updating a portion of the first L2P mapping tables to generate an updated portion of the first L2P mapping tables according to logical addresses of the plurality of data, and updating a portion of the plurality of second L2P mapping tables to generate an updated portion of the second L2P mapping tables according to the logical addresses of the plurality of data;

writing the updated portion of the first L2P mapping table and the updated portion of the second L2P mapping table to a host buffer in the host device;

establishing a first group to physical address (G2P) mapping table and a second G2P mapping table respectively corresponding to the first group and the second group, wherein the first G2P mapping table records the plurality of first L2P mapping tables and corresponding physical addresses; and the second G2P mapping table records the plurality of second L2P mapping tables and corresponding physical addresses;

writing the first G2P mapping table and the second G2P mapping table into the host buffer;

establishing a storage unit link relationship table and a last updated storage unit table, which record the L2P mapping tables stored in a plurality of storage units of the host buffer and the groups to which they belong;

selecting the first group, reading the first G2P mapping table from the host buffer, and storing the first G2P mapping table in a buffer memory of the flash memory controller;

reading the updated portion of the first L2P mapping tables corresponding to first group from the host buffer according to the storage unit link relationship table and the last updated storage unit table, and writing the updated portion of the first L2P mapping tables into a first physical address of the flash memory module; and updating the first G2P mapping table to make the updated portion of the first L2P mapping tables corresponds to the first physical address.

10. The memory device of claim 9, further comprising:
selecting the second group, moving the first G2P mapping table from the buffer memory to the host buffer, reading the second G2P mapping table from the host buffer, and storing the second G2P mapping table into the buffer memory of the flash memory controller;

reading the updated portion of the second L2P mapping tables corresponding to second group from the host buffer according to the storage unit link relationship table and a last updated storage unit table, and writing the updated portion of the second L2P mapping tables into a second physical address of the flash memory module; and updating the second G2P mapping table to make the updated portion of the second L2P mapping tables corresponds to the second physical address.

11. The memory device of claim 9, wherein the storage unit link relationship table comprises the plurality of storage units of the host buffer, the L2P mapping table stored in each storage unit, and a previous storage unit of each storage unit corresponding to the same group.

12. The memory device of claim 11, wherein for each group, the last updated storage unit table records the storage unit storing a last updated L2P mapping table in the corresponding group.

* * * * *